United States Patent
Hahn et al.

(10) Patent No.: US 11,965,969 B2
(45) Date of Patent: Apr. 23, 2024

(54) CLEANING APPARATUS FOR CLEANING A SURFACE OF A SENSOR APPARATUS

(71) Applicant: Continental Automotive GmbH, Hannover (DE)

(72) Inventors: Torsten Hahn, Frankfurt am Main (DE); Dirk Ringler, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 815 days.

(21) Appl. No.: 17/022,645

(22) Filed: Sep. 16, 2020

(65) Prior Publication Data

US 2021/0088668 A1     Mar. 25, 2021

(30) Foreign Application Priority Data

Sep. 25, 2019    (DE) ...................... 10 2019 214 704.6

(51) Int. Cl.
| | |
|---|---|
| *G01S 17/931* | (2020.01) |
| *B60S 1/52* | (2006.01) |
| *B60S 1/56* | (2006.01) |
| *G01S 7/481* | (2006.01) |

(52) U.S. Cl.
CPC ............... *G01S 17/931* (2020.01); *B60S 1/52* (2013.01); *B60S 1/56* (2013.01); *G01S 7/4813* (2013.01)

(58) Field of Classification Search
CPC ................. G01S 17/931; G01S 7/4813; G01S 2007/4977; G01S 7/497; B60S 1/52; B60S 1/56; B60S 1/54

USPC ......................................................... 356/4.01
See application file for complete search history.

(56) References Cited

U.S. PATENT DOCUMENTS

| | | | |
|---|---|---|---|
| 10,286,880 B2 * | 5/2019 | Schmidt | .................. B60R 16/08 |
| 11,148,609 B2 | 10/2021 | Robertson, Jr. et al. | |
| 11,529,932 B2 | 12/2022 | Hester | |
| 11,590,936 B2 | 2/2023 | Bopp et al. | |
| 2011/0073142 A1 | 3/2011 | Hattori et al. | |

(Continued)

FOREIGN PATENT DOCUMENTS

| | | |
|---|---|---|
| CN | 109789449 A | 5/2019 |
| CN | 112550227 A | 3/2021 |
| DE | 4217559 A1 | 12/1993 |

(Continued)

OTHER PUBLICATIONS

German Search Report for German Application No. 10 2019 214 704.6, dated Mar. 3, 2022, with partial English translation, 10 pages.

(Continued)

*Primary Examiner* — Daniel L Murphy
(74) *Attorney, Agent, or Firm* — BUCHANAN INGERSOLL & ROONEY PC

(57) ABSTRACT

An optically and aerodynamically optimized and particularly wind-insensitive cleaning apparatus for cleaning a surface of a sensor apparatus of a vehicle with a fluid cleaning agent. The surface is surrounded by an outer surface region with respect to which the surface is arranged so as to be substantially flush therewith or curved in a domed manner above it, and, in relation to the outer surface region, the nozzle is positioned in a recessed manner such that the spraying of the cleaning agent is realized below the outer surface region.

14 Claims, 4 Drawing Sheets

(56) References Cited

U.S. PATENT DOCUMENTS

| | | |
|---|---|---|
| 2018/0194328 A1 | 7/2018 | Numakunai |
| 2019/0071058 A1 | 3/2019 | Grasso et al. |

FOREIGN PATENT DOCUMENTS

| | | |
|---|---|---|
| DE | 102018125538 A1 | 4/2020 |
| DE | 102020102678 A1 | 8/2020 |
| JP | 2012-201122 A | 10/2012 |
| JP | 2014008868 A | 1/2014 |
| JP | 2016-078688 A | 5/2016 |
| WO | 2018231071 A1 | 12/2018 |

OTHER PUBLICATIONS

Office Action (First Office Action) issued Feb. 7, 2024, by the State Intellectual Property Office of People's Republic of China in corresponding Chinese Patent Application No. 202011011411.2 and an English translation of the Office Action. (14 pages).

* cited by examiner

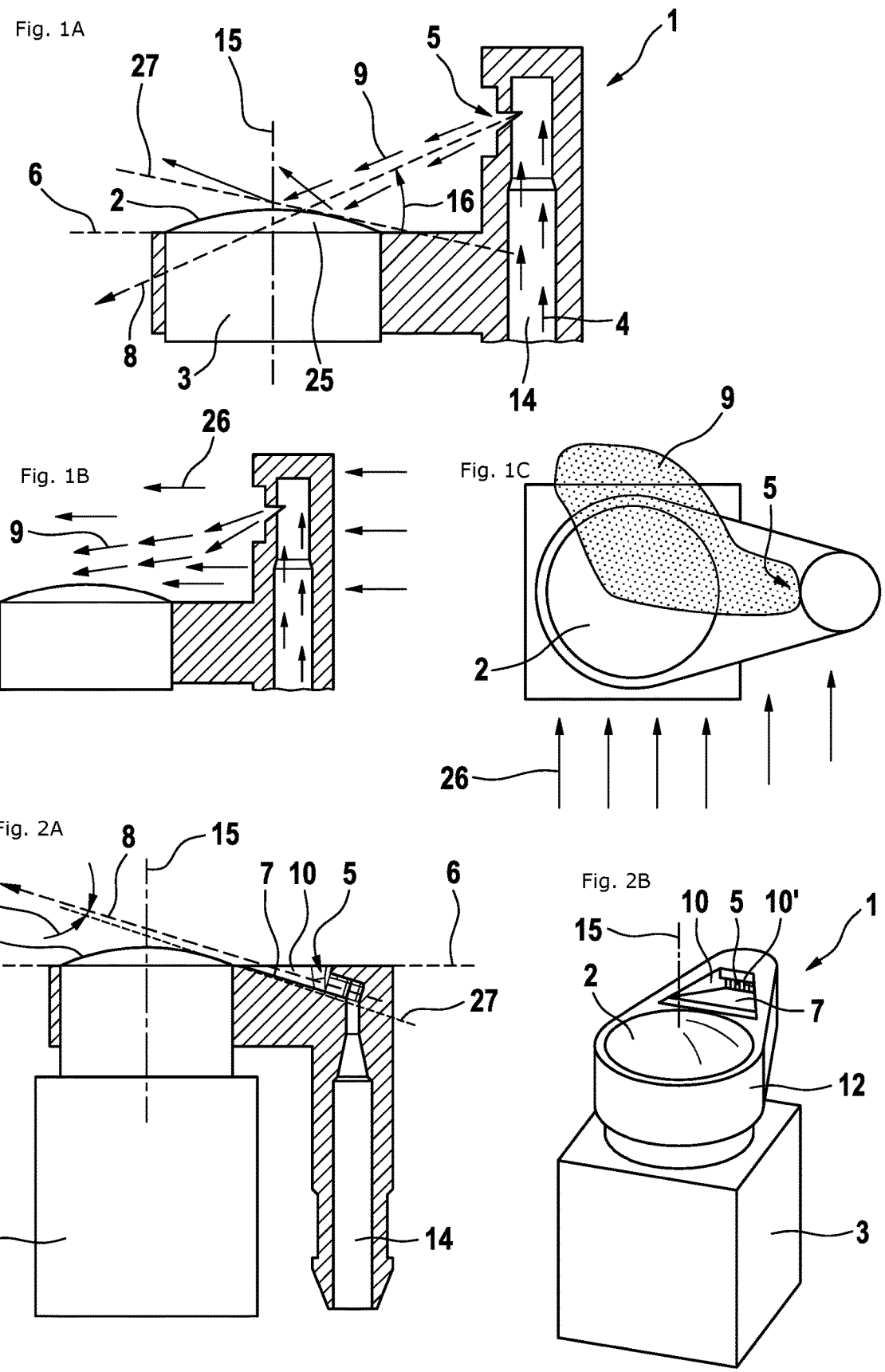

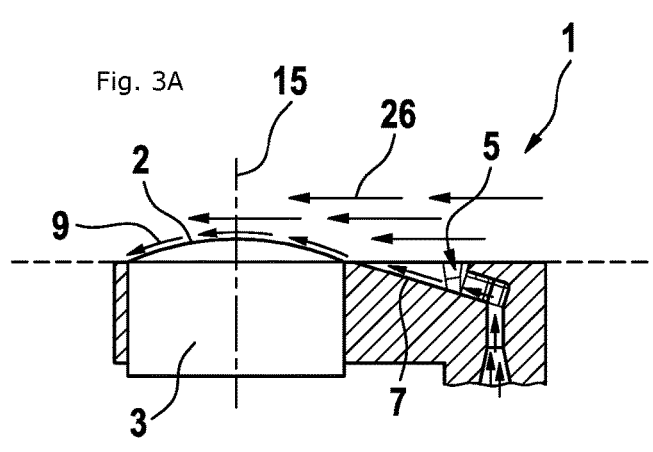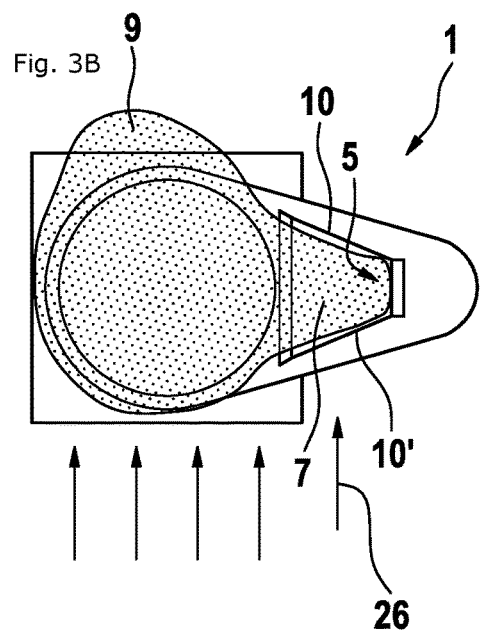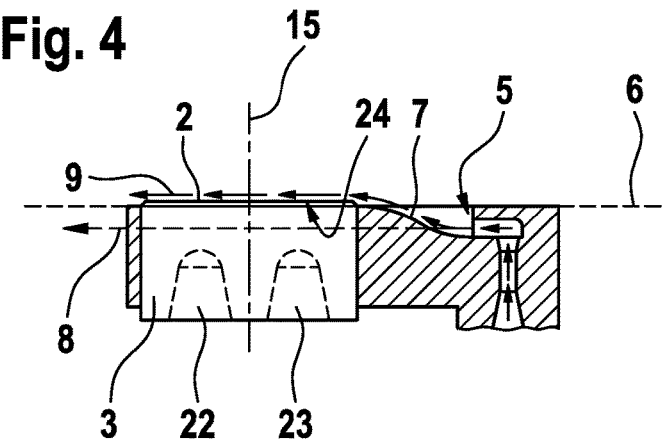

CLEANING APPARATUS FOR CLEANING A SURFACE OF A SENSOR APPARATUS

CROSS REFERENCE TO RELATED APPLICATIONS

This application claims priority to German Patent Application No. 10 2019 214 704.6, filed Sep. 25, 2019, the contents of such applications being incorporated by reference herein.

FIELD OF THE INVENTION

The invention relates to a cleaning apparatus for cleaning a surface of a sensor apparatus, in particular a camera lens or an outer cover of a lidar, and to a structural unit comprising the cleaning apparatus and the sensor apparatus, and to a sensor system for detecting vehicle surroundings that comprises at least one of the components mentioned above.

BACKGROUND OF THE INVENTION

Assistance systems with sensors are nowadays increasingly installed in motor vehicles, and are intended to assist the vehicle user when the vehicle is being driven while reliably detecting and monitoring the surroundings of the vehicle at all times. Such assistance systems comprise for this purpose optical or optoelectronic apparatuses such as for example cameras and laser-based or infrared sensors. Such apparatuses have transparent elements such as lenses or covers, which, depending on the usage situation, transmit the light without limitation or in a specific limited wave range. Such transparent elements are often of outwardly convex or domed form so as to allow, for example, a particularly wide detection range for a camera, in the manner for example of so-called fisheye camera lenses. Furthermore, such transparent elements are, for functional reasons, arranged on the outside of the vehicle and are therefore exposed to contamination and external weather influences and, for ensuring functionality, must be cleaned as required.

Most known generic cleaning systems have nozzles which are positioned laterally, eccentrically with respect to the sensor axis and with a protrusion with respect to the surface to be cleaned, such as are known for example from US 2011/073142 A1, which is incorporated herein by reference.

Cameras for detecting the surroundings of a vehicle normally have particularly wide viewing angles of 180° and more. The protruding structures may cover a part of the field of view, with the result that possible sources of danger are not detected. Moreover, the aerodynamics are adversely affected, the relative wind being able to generate undesired swirling which disturbs the cleaning jet.

Visible exposed cleaning components are also undesired for design reasons.

As a remedy, it is known to use movable, telescopable lifting nozzles which are extended from a flush parking position into a protruding operating position only when required.

However, such systems are complex, expensive, susceptible to wear and sensitive to environmental influences, and also require more structural space. At the same time, the field of view is still obstructed, at least during the spraying process.

A common feature of all the known cleaning systems is the problem of sensitivity to wind. As a result of the relative wind, the cleaning jet can be diverted so greatly that the surface to be cleaned is wetted with cleaning liquid incompletely to not at all.

In order to mitigate this effect, it is known to increase the pressure and quantity of the cleaning liquid per cleaning process. This reduces the efficiency of the system, and requires a larger supply of the cleaning agent and system components which have larger dimensions and are thus more expensive.

SUMMARY OF THE INVENTION

Against this background, an aspect of the invention is an improved cleaning apparatus, which overcomes the aforementioned disadvantages and in the process is able to be produced and assembled as inexpensively as possible.

An aspect of the invention provides that, in relation to an outer surface region surrounding the surface to be cleaned, the nozzle is positioned in a recessed manner such that the spraying of the cleaning agent is realized below the outer surface region.

Due to the recessed installation of the nozzle, the detection range or the field of measurement of the sensor apparatus, even at large opening angles of around 180° or more, is not obstructed or restricted at any time during operation by any protrusions or disruptive contours. At no time is the functioning of the sensor apparatus impaired.

An optically and aerodynamically optimized surface can be realized. The cleaning elements are neither visible to a person from the outside nor form aerodynamic sources of disturbance, which could be the cause of undesired swirling of the air flow and noises.

An aspect of the invention also provides that, between the nozzle and the surface, a guide ramp for guiding a fluid stream discharged from the nozzle in a spraying direction is provided such that the fluid stream impinges substantially tangentially on the surface. For such a fluid stream oriented close to the surface and tangential thereto, physical effects generally known as the Coandă effect and the Bernoulli effect and causing the cleaning agent to be sucked to the surface and to follow the contour thereof come into play even at relatively low fluid speeds. This makes the cleaning process insensitive to wind, the cleaning action being reliable at high speeds too and the supply pressure and quantity of the cleaning agent per cleaning cycle being able to be reduced.

According to a preferred embodiment of the invention, the guide ramp may have two opposite side surfaces, whose distance from one another is provided to be smaller on the nozzle side than on the surface side. As a consequence, the fluid stream, after leaving the nozzle, can be reliably shaped and exactly oriented and, moreover, does not at any time run in an uncontrolled manner over surface regions not intended for this purpose.

According to a first refinement, the guide ramp may, in cross section, be formed so as to be substantially straight and parallel to the spraying direction. It is thus possible in a particularly simple manner for a cleaning apparatus optimized in particular for tangential spraying of domed surfaces to be realized.

According to another refinement, the guide ramp may, in cross section, be formed so as to be at least sectionally curved, in particular with one or more changes to the curvature behavior. This makes it possible to realize optimal plane-parallel spraying of planar surfaces and/or a spraying direction at the nozzle that is plane-parallel with respect to the surface. In the case of a point of inflection in the curvature of the guide ramp, a planar surface can be combined with a spraying direction parallel to the surface without any problems.

For particularly simple and efficient production and assembly, the cleaning apparatus may preferably be combined with the sensor apparatus in a common housing to form a common structural unit.

For a particularly flexible configuration and assembly, the cleaning apparatus, according to another embodiment, may be provided as a separate insert element for insertion into a receiving seat formed adjacent to the surface.

The cleaning apparatus according to an aspect of the invention can be used particularly effectively together with a digital camera or a lidar.

An aspect of the invention also claims a structural unit comprising at least one cleaning apparatus according to the invention and at least one sensor apparatus.

An aspect of the invention also claims a sensor system for detecting vehicle surroundings, comprising at least one cleaning apparatus according to an aspect of the invention and/or structural unit according to an aspect of the invention.

BRIEF DESCRIPTION OF THE DRAWINGS

An aspect of the present invention will be discussed in more detail below on the basis of various exemplary embodiments. In the figures:

FIGS. 1A-1C show a simplified illustration of a known disadvantageous embodiment with a nozzle arranged above the outer surface region (a) and the effect of relative wind in side view (b) and in plan view (c), FIGS. 2A-2B show a simplified illustration of a first embodiment according to the invention in cross section (a) and in three dimensions (b), FIG. 3A-3B show a simplified illustration of the functioning of the embodiment as per FIGS. 2A-2B in the presence of relative wind in cross section A and in plan view B, FIG. 4 shows another embodiment according to the invention with a planar surface and multiply curved guide ramp.

DETAILED DESCRIPTION OF THE PREFERRED EMBODIMENTS

Figure 5A:
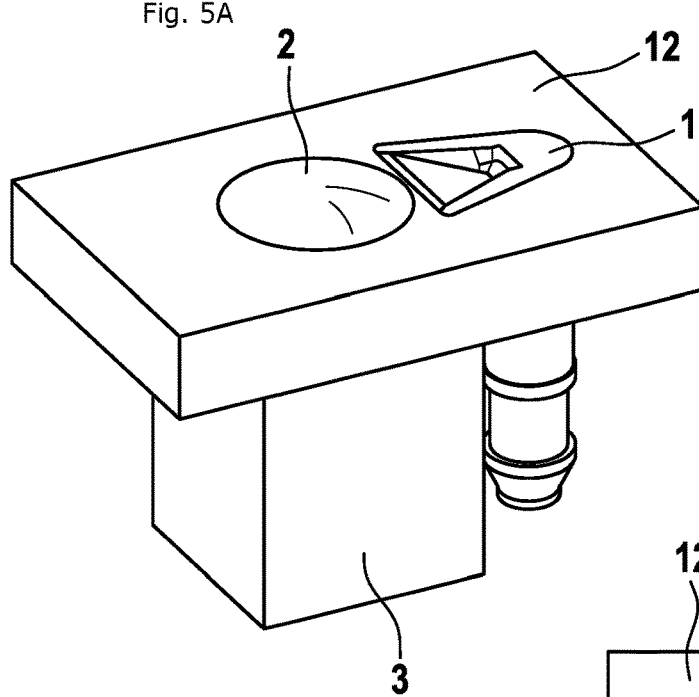
FIGS. 5A-5D show an embodiment according to the invention with a cleaning apparatus designed as a separate insert element.
Figure 5B:
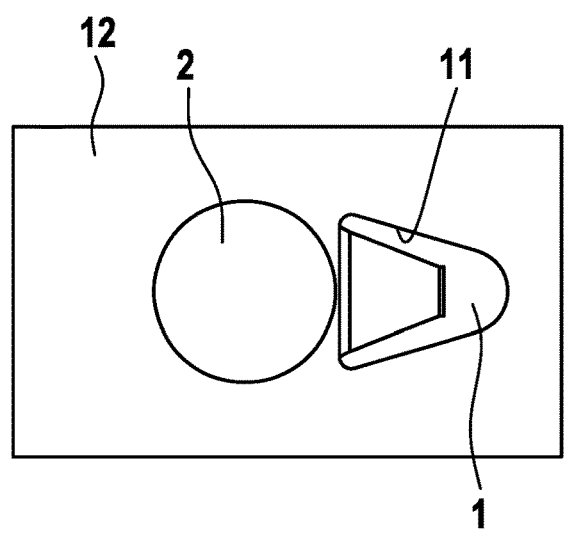
Figure 5C:
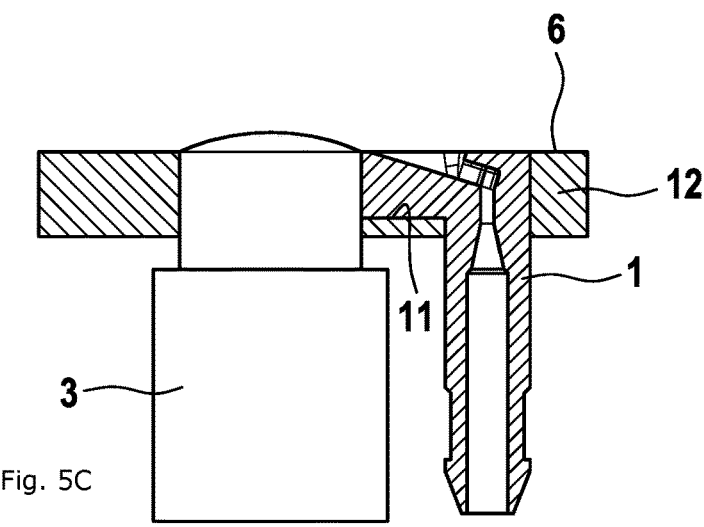
Figure 5D:
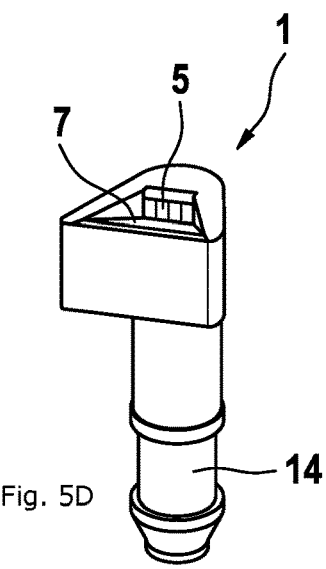

In all the figures, the same or equivalent elements and apparatuses, unless stated otherwise, are denoted by the same reference signs.

FIGS. 1A-1C

FIG. 1A shows a known cleaning apparatus 1 for a sensor apparatus 3 designed as a digital camera. A nozzle 5 is arranged in an elevated position with respect to the camera lens 25, laterally offset from the optical sensor axis 15 thereof. The fluid cleaning agent 4 is conveyed at positive pressure via an inflow 14 to the nozzle 5 and, from there, discharged as a fluid stream 9 in a spraying direction 8. Owing to the elevated position of the nozzle 5, the fluid stream 9 impinges on the surface 2 of the camera lens 25 at a relatively sharp impingement angle 16 and partially rebounds off said surface.

An angle between the spraying direction 8 and the tangent 27 to the surface 2 in the region of the impingement of the fluid stream 9 on the surface 2 is taken to be the impingement angle 16.

FIGS. 1B and 1C show the influence of the relative wind 26 on the fluid stream 9. The fluid stream 9 is deflected from its intended trajectory by the inflowing air masses. As a result, a part of the surface 2 is not reached and wetted by the cleaning fluid, and thus not cleaned either.

FIGS. 2A-2B FIGS. 2A-2B show a first embodiment according to the invention of the cleaning apparatus 1 in an exemplary embodiment comparable with FIGS. 1A-1C and with a digital camera as a sensor apparatus 3.

The cleaning apparatus 1 is combined with the sensor apparatus 3 in a common housing 12 to form a common structural unit for the purpose of simplified handling and assemblability. The outwardly directed front surface of the housing 12 is configured so as to be flush with the outer surface region 6 and forms a part thereof.

The curvature of the surface 2 of the camera lens is raised slightly above an outer surface region 6 circumferentially surrounding it. In practice, this may for example be the outer surface of the vehicle body or of a vehicle component in which the structural unit is installed.

A nozzle 5 is stationary and is positioned so as to be recessed below the outer surface region 6 laterally offset from the sensor axis 15. In the exemplary embodiment shown, the nozzle 5 is designed as a simple and robust deflector nozzle or impingement nozzle, wherein other nozzle forms are also permissible within an aspect of the invention. A spraying direction is structurally determined for the selected nozzle type and cannot be adjusted. Here, the spraying direction 8 is oriented such that the discharged fluid stream 9 impinges as tangentially as possible on the surface 2 at the outer edge thereof. The resulting impingement angle 16 is ideally equal to 0° or is at least particularly shallow and tending towards 0°.

A guide ramp 7 is arranged between the nozzle 5 and the surface 2. The fluid stream 9 follows the contour of the guide ramp 7 on its path from the nozzle 5 to the surface 2. In the embodiment shown, the guide ramp 7 is, in cross section, formed so as to be substantially straight and parallel to the spraying direction 8.

The guide ramp 7 has two opposite side surfaces 10, 10' forming a kind of funnel shape which opens toward the surface 2 and thus, in addition to the nozzle 5, contributing to the exactly defined shaping of the fluid stream 9.

FIGS. 3A-3B

The fluid stream 9 discharged along the guide ramp 7 from the nozzle 5 flows over the guide ramp 7 to the surface 2. For such a fluid stream 9 oriented close to the surface and tangential thereto, physical effects generally known as the Coandă effect and the Bernoulli effect come into play even at relatively low fluid speeds. Said effects lead to the fluid stream 9 being sucked to the surface 2, necessarily following the curvature thereof and thus cleaning it. The cleaning agent 4, as it were, adheres to the surface 2.

The impinging relative wind 26 is consequently not able to effectively act below the fluid stream 9 and divert, disperse or blow away said fluid stream so significantly that the cleaning action would be reduced. The entire surface 2 remains wetted.

FIG. 4

FIG. 4 illustrates another embodiment of the invention. By contrast to the above-described exemplary embodiments, the sensor apparatus 3 is provided as a lidar. This has a flat cover 24 which protects the transmitting and receiving units 22, 23 of the sensor apparatus 3 and whose surface 2 has to be cleaned.

In this case, the surface 2 is not domed, but rather is configured so as to be plane-parallel with respect to and substantially flush with the outer surface region 6. Furthermore, in the exemplary embodiment shown, the recessed nozzle 5 is configured such that the spraying direction 8 is oriented parallel to the outer surface region 6. A nozzle configuration for an angled spraying direction 8 as per FIGS. 2 and 3 naturally remains permissible within an aspect of the invention.

The matched guide ramp 7 is, in cross section, of curved form by contrast to the above-described straight configuration and has, in cross section, a concave curved portion and a convex curved portion, with a point of inflection between the corresponding portions. In this way, it is achieved that the fluid stream 8, despite the planar surface 2, still impinges on the latter at an impingement angle 16 equal to 0° and thus in a parallel manner.

FIGS. 5A-5D

FIGS. 5A-5D illustrate a further embodiment. In the exemplary embodiments shown above, the nozzle 5 was provided as an integral constituent part of the housing 12, formed as one part therewith. By contrast thereto, the cleaning unit 1, with the nozzle 5, the guide ramp 7 and the inflow 14, is configured as a separate insert element which is inserted into a corresponding receiving seat 11 arranged adjacent to the surface 2.

Within an aspect of the invention, it is possible for the receiving seat 11 as illustrated here to be provided in the housing 12 such that, after the insertion of the cleaning apparatus 1, a common structural unit is formed with the sensor apparatus 3.

In certain applications, however, it can be advantageous for a structural unit not to be formed and instead for the receiving seat 11 to be provided directly in the body panel or another vehicle component, with the result that the cleaning apparatus 1 and the sensor apparatus 3 each have to be mounted individually, separately from one another. Such a solution remains permissible at all times within an aspect of the invention.

FIG. 6

Figure 6:
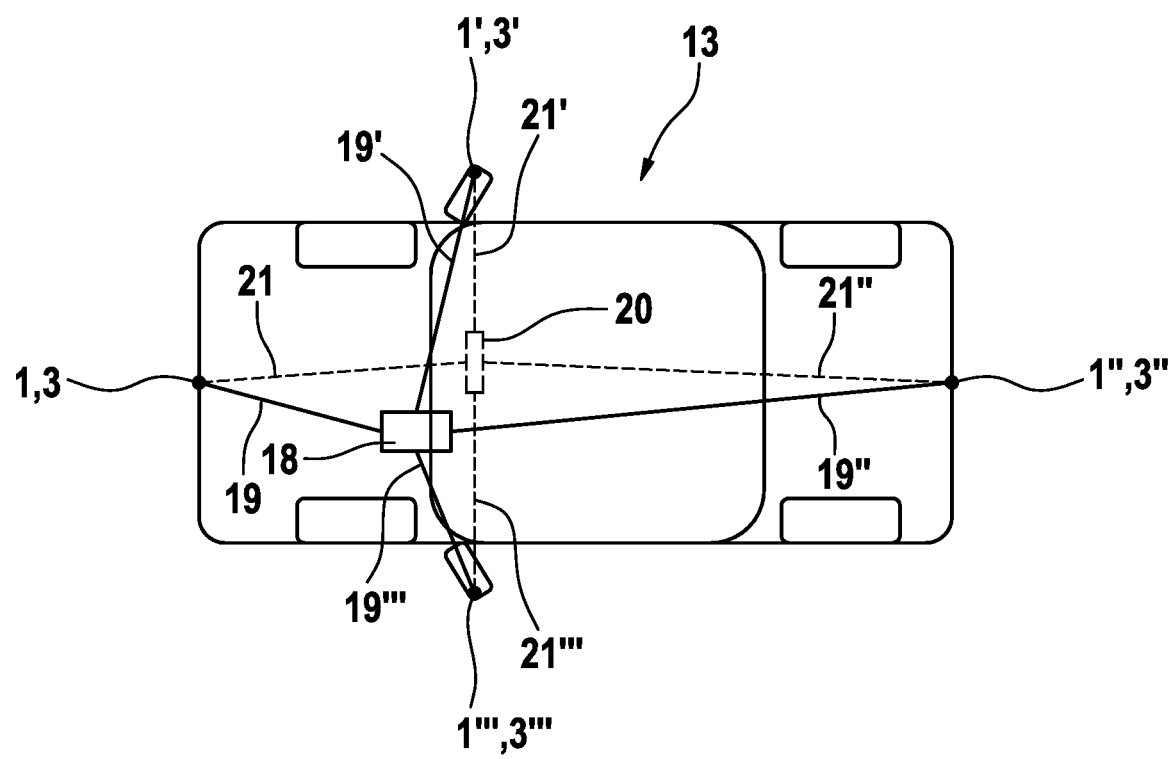
FIG. 6 shows a highly simplified illustration of a sensor system for detecting vehicle surroundings.

FIG. 6 illustrates by way of example and in a highly simplified manner a preferred possible application of an aspect of the invention within a sensor system 13 for detecting vehicle surroundings.

Multiple structural units comprising in each case one cleaning apparatus and one sensor apparatus 1&3; 1'&3'; 1"&3"; 1'"&3'" are attached at exposed positions of a vehicle so as to make possible 180° circumferential visibility.

A central supply device 18 supplies the cleaning apparatuses 1-1'" with the cleaning agent 4 via corresponding supply lines 19-19'" by means of a conveying pump (not shown). A central control device 20 is connected to the respective sensor apparatuses 3-3'" using dedicated control lines 21-21'", supplies said sensor apparatuses with power in this way, and sends and receives the electrical signals for the purpose of further processing.

LIST OF REFERENCE SIGNS

1 Cleaning apparatus
2 Surface
3 Sensor apparatus
4 Cleaning agent
5 Nozzle
6 Outer surface region
7 Guide ramp
8 Spraying direction
9 Fluid stream
10 Side surface
11 Receiving seat
12 Housing
13 Sensor system
14 Inflow
15 Sensor axis
16 Impingement angle
17 Outer element
18 Supply device
19 Supply line
20 Control device
21 Control line
22 Transmitting unit
23 Receiving unit
24 Cover
25 Camera lens
26 Relative wind
27 Tangent

The invention claimed is:

1. A cleaning apparatus for cleaning a surface of a sensor apparatus of a vehicle, comprising:
at least one nozzle for discharging a fluid cleaning agent, wherein the surface of the sensor is surrounded by an outer surface region with respect to which the surface is arranged so as to be substantially flush therewith or curved in a domed manner above the outer surface region, and, in relation to the outer surface region, the at least one nozzle is positioned in a recessed manner such that a spraying of a cleaning agent is realized below the outer surface region; and
a guide ramp, positioned between the nozzle and the surface of the sensor, for guiding a fluid stream discharged from the nozzle in a spraying direction, the guide ramp comprising two opposite side surfaces, whose distance from one another is smaller on a nozzle side of the guide ramp than on a surface side of the guide ramp.

2. The cleaning apparatus as claimed in claim 1, wherein, the guide ramp is adapted to guide a fluid stream discharged from the nozzle in a spraying direction such that the fluid stream impinges substantially tangentially on the surface of the sensor.

3. The cleaning apparatus as claimed in claim 2, wherein the guide ramp is, in cross section, formed so as to be substantially straight and parallel to the spraying direction.

4. The cleaning apparatus as claimed in claim 2, wherein the guide ramp is, in cross section, formed so as to be at least sectionally curved.

5. The cleaning apparatus as claimed in claim 4, wherein the guide ramp has, in cross section, at least one change to its curvature behavior.

6. The cleaning apparatus as claimed in claim 4, wherein the guide ramp has, in cross section, at least one change to at least one point of inflection.

7. The cleaning apparatus as claimed in claim 1, wherein the cleaning apparatus is provided as a separate insert element for insertion from the outer surface region into a receiving seat formed adjacent to the surface of the sensor.

8. The cleaning apparatus as claimed in claim 1, wherein the sensor apparatus is a digital camera or a lidar.

9. The cleaning apparatus as claimed in claim 1, wherein the cleaning apparatus is combined with the sensor apparatus in a common housing to form a common structural unit.

10. A structural unit as claimed in claim 9.

11. A sensor system for detecting vehicle surroundings, comprising at least one structural unit as claimed in claim 10.

12. A sensor system for detecting vehicle surroundings, comprising at least one cleaning apparatus as claimed in claim 1.

13. The cleaning apparatus as claimed in claim 1, wherein the guide ramp is, in cross section, formed so as to be substantially straight and parallel to the spraying direction.

14. The cleaning apparatus as claimed in claim 1, wherein the guide ramp is, in cross section, formed so as to be at least sectionally curved.

* * * * *